Figure 1:
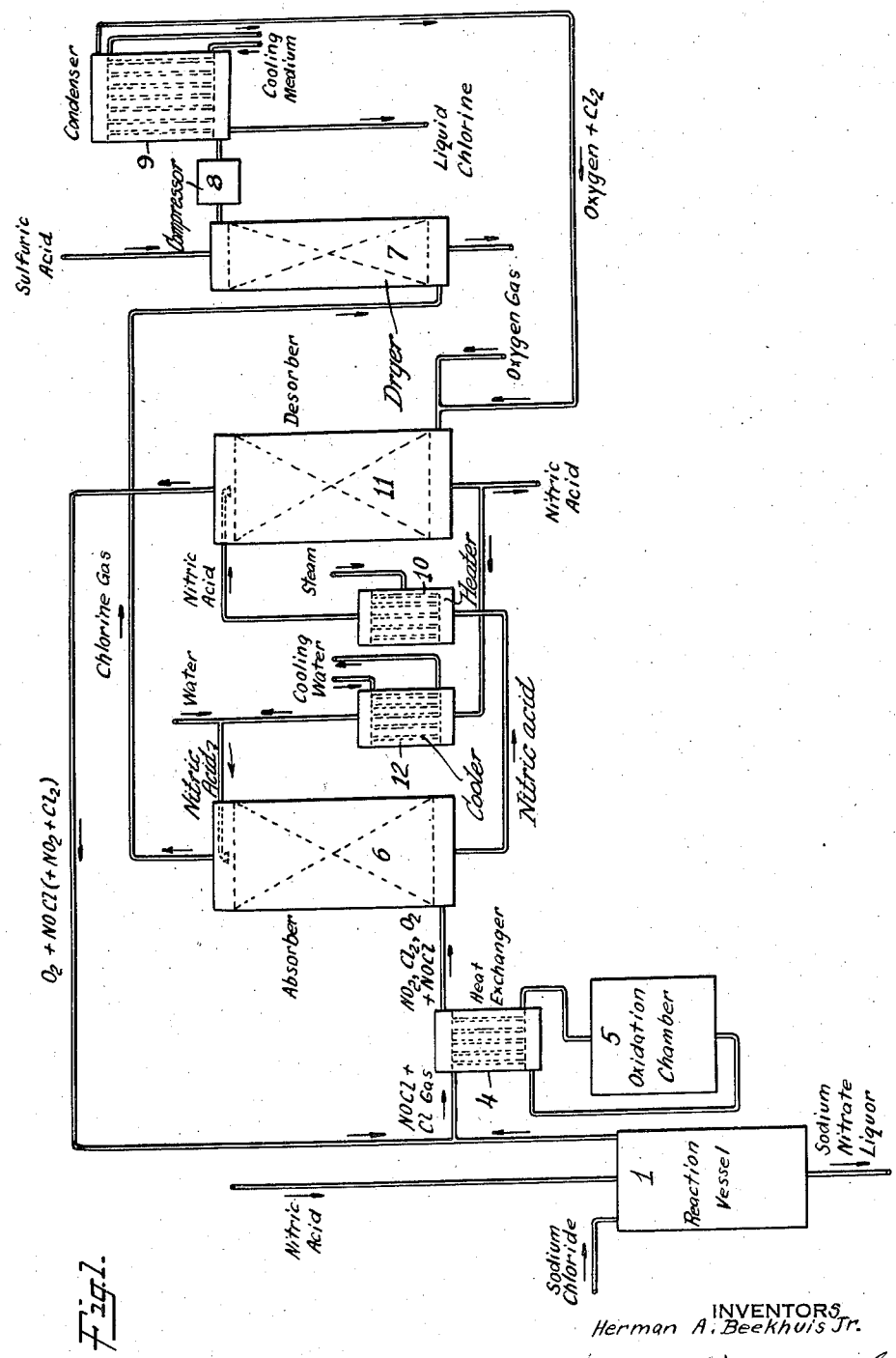

Patented Mar. 14, 1939

2,150,669

UNITED STATES PATENT OFFICE 2,150,669

PROCESS FOR THE TREATMENT OF MIXTURES OF NITROSYL CHLORIDE AND CHLORINE

Herman A. Beekhuis, Jr., Petersburg, Va., assignor, by mesne assignments, to The Solvay Process Company, New York, N. Y., a corporation of New York Application November 9, 1933, Serial No. 697,241

22 Claims. (Cl. 23—157)

This invention relates to a process for the treatment of mixtures of nitrosyl chloride and chlorine to separately recover valuable products from the mixture. The invention particularly relates to a process for treating the gases containing nitrosyl chloride and chlorine which are formed by the reaction of relatively concentrated nitric acid at elevated temperatures with a chloride such as sodium chloride, potassium chloride or calcium chloride. This reaction forms a nitrate such as sodium, potassium or calcium nitrate. The nitric acid may be supplied either as preformed nitric acid or it may be formed in the presence of the chloride by treating the chloride in an aqueous medium with nitrogen oxides forming nitric acid by reaction with the water which is present. In either case a gaseous mixture containing nitrosyl chloride and chlorine may be obtained.

It is an object of this invention to provide a method for the treatment of gases containing nitrosyl chloride and chlorine to convert the mixture into utilizable products. It is particularly an object of this invention to provide a process whereby the chlorine content of the mixture, both the free chlorine and that combined as nitrosyl chloride, may be recovered as a relatively pure chlorine gas which may be treated to obtain liquid chlorine. It is likewise an object of this invention to provide a process whereby the combined nitrogen content of the gas, i. e., the nitrogen present as nitrosyl chloride and that present in the form of nitrogen oxides which may be present in the gaseous mixture, is recovered as a relatively pure nitrogen oxide product which may be converted if desired into nitric acid. Further objects of the invention in part will be obvious and in part will appear hereinafter.

In treating a gas containing nitrosyl chloride and chlorine in accordance with this invention the gas may be heated with oxygen to oxidize nitrosyl chloride to nitrogen peroxide and chlorine. This oxidation of the nitrosyl chloride may be carried out either in the presence or in the absence of materials catalyzing the reaction of the nitrosyl chloride with the oxygen. The mixture of nitrogen peroxide, chlorine and residual unoxidized nitrosyl chloride thus obtained is treated to separate the chlorine from the nitrogen peroxide and nitrosyl chloride. This separation may be carried out, for example, by passing the gaseous mixture at a temperature below 50° C. in contact with nitric acid, preferably containing about 60% to 90% $HNO_3$ which acts to absorb the nitrogen peroxide and nitrosyl chloride. The unabsorbed chlorine passes out of contact with the nitric acid and may be dried and liquefied to produce a liquid chlorine product.

Instead of employing nitric acid in the manner described, the gaseous mixture may be cooled, preferably under pressure, to condense a liquid mixture of nitrogen peroxide, chlorine and nitrosyl chloride, and this liquid mixture then fractionally distilled to vaporize the chlorine and leave a residue containing nitrogen peroxide and nitrosyl chloride.

Following the separation of the chlorine the nitrosyl chloride is recovered separate from the nitrogen peroxide. Thus the nitric acid from the absorption of the nitrogen peroxide and nitrosyl chloride may be heated to strip from it nitrosyl chloride, leaving a relatively pure nitric acid product containing in addition to the nitric acid used for scrubbing the gaseous mixture, that formed by reaction of absorbed nitrogen peroxide with the water in the acid. It is preferred to pass oxygen gas in contact with the heated nitric acid solution, thereby facilitating the evolution of the nitrosyl chloride from the solution. The nitrosyl chloride evolved from the nitric acid solution may be returned for oxidation together with additional quantities of the nitrosyl chloride and chlorine gas in the manner described above. A part of the nitric acid from which the nitrosyl chloride has been stripped may be cooled and after being mixed with water, returned for absorption of nitrogen peroxide and nitrosyl chloride from the gas containing these substances together with chlorine from the above oxidation procedure. The rest of the acid may be withdrawn as a product of this process. The amounts of withdrawn acid and added water are so proportioned that the concentration of nitric acid employed in absorbing nitrogen peroxide and nitrosyl chloride is maintained substantially constant. The amount of nitric acid withdrawn is equivalent to that formed by the reaction of the nitrogen peroxide with the water.

In the process of this invention in which the chlorine is fractionally distilled from a liquid mixture of nitrogen peroxide, chlorine and nitrosyl chloride, the separation of nitrogen peroxide and nitrosyl chloride in the residue from the chlorine distillation may be accomplished by separately fractionally distilling this residue. The nitrosyl chloride is vaporized at a somewhat lower temperature than the nitrogen peroxide and may be returned to be oxidized together with the nitrosyl chloride and chlorine gas as described above. The nitrogen peroxide thus separated from nitrosyl chloride may be recovered as a liquid nitrogen peroxide product or as a concentrated gas, either of which may be reacted with water to produce nitric acid.

The nitric acid formed as one of the products of the foregoing methods of treating the nitrosyl chloride and chlorine gas may, if desired, be utilized in the production of a nitrate by reacting this acid with a chloride such as sodium chloride, potassium chloride or calcium chloride.

This invention further includes improvements in individual steps of the general processes above described, particularly in catalysts for the oxidation of nitrosyl chloride.

Figure 2:
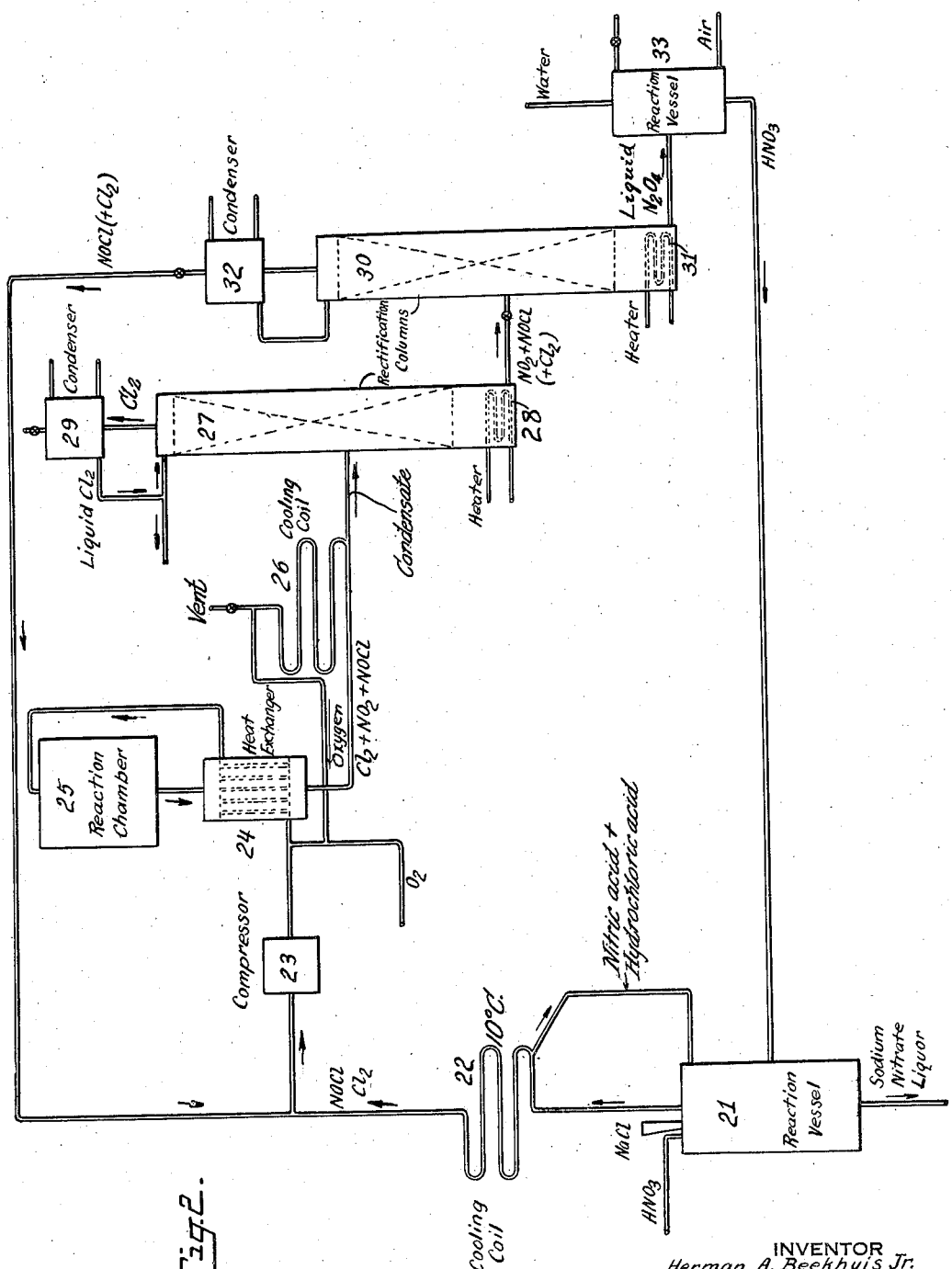

For a fuller understanding of the nature and objects of the invention reference should be had to the following detailed description taken in connection with the accompanying drawings in which Fig. 1 illustrates a process for the treatment of nitrosyl chloride and chlorine mixtures by oxidizing nitrosyl chloride and then employing nitric acid for the recovery from the mixture of relatively pure chlorine and a nitric acid product. Fig. 2 of the drawings illustrates a method for the treatment of nitrosyl chloride and chlorine mixtures in which after oxidation of the nitrosyl chloride, chlorine and nitrogen peroxide are recovered by liquefaction and fractional distillation and the nitrogen peroxide is reacted to form nitric acid.

Referring to Fig. 1, the reference numeral 1 indicates a reaction vessel into which sodium chloride and nitric acid are fed and are reacted to form sodium nitrate and a gaseous mixture containing nitrosyl chloride and chlorine. This gaseous mixture of nitrosyl chloride and chlorine is mixed with sufficient oxygen for the oxidation of the nitrosyl chloride and passed through a heat exchanger 4 and thence to an oxidizing chamber 5. The products of the oxidation are passed through heat exchanger 4 in indirect heat exchange with the nitrosyl chloride-chlorine gas on its way to oxidation chamber 5. In heat exchanger 4 the gas containing nitrosyl chloride, chlorine and oxygen is heated to a temperature of, for example, about 200° C. and at this temperature is passed into contact with a catalyst in the oxidation chamber. This catalyst is preferably a zeolite material such as a hydrated calcium aluminum silicate which occurs naturally as the mineral chabazite. Other zeolites, both natural and synthetic, and aluminum compounds such as naturally occurring bauxite, artificially prepared alumina or activated alumina may be used.

Crude chabazite mineral which occurs naturally in Nova Scotia and New South Wales is prepared for use by separating the chabazite crystals from the bulk of foreign material present and then reducing the particle size to about 0.05 inch in diameter. If desired, the material may be dried by heating it in a current of dry air to a temperature of about 300° C. or higher.

An alumina catalyst may be prepared as follows, the amounts of material being given in each instance in parts by weight: about 162 parts of aluminum metal are dissolved in about 960 parts of a 50% NaOH solution. The solution of sodium aluminate is filtered, diluted with about 1500 parts of water and is heated to about 80° C. Carbon dioxide gas is passed into the solution to neutralize the excess alkalinity and the solution is cooled to about 30° C. to 35° C. with stirring, while the crystalline aluminum hydroxide (hydrated alumina) is precipitating. After allowing the mixture of precipitate and solution to stand for a prolonged period of time, the solution is completely neutralized by carbon dioxide gas and the crystals separated from solution and washed. The recovered crystals are dried and dehydrated, either partially or substantially completely, by heating. The material may be heated to about 120° C. for example. Higher temperatures, up to about 400° C. may be employed, if desired, for dehydrating the aluminum hydroxide. The dried material is formed into tablets having, for example, a diameter of about 0.1 inch. Soluble aluminates other than sodium aluminate may be employed in preparing an alumina catalyst in the manner described.

Commercial alumina marketed as "activated alumina" may be employed as a catalyst. For example, an activated alumina consisting of partially dehydrated essentially pure $Al_2O_3.3H_2O$, which may be purchased on the market, is an active catalyst. The analysis of this commercial product showed:

|  | Per cent |
|---|---|
| $Al_2O_3$ | 91.23 |
| Loss on ignition | 7.10 |
| $SiO_2$ | 0.08 |
| $Fe_2O_3$ | 0.01 |
| $TiO_2$ | 0.01 |

During the passage of the gas in contact with the catalyst in oxidation chamber 5 it is maintained at a temperature not above about 350–400° C. and preferably at about 300° C. The reaction of nitrosyl chloride with the oxygen is exothermic so that in preheating the incoming gas to a temperature of about 200° C., the desired temperature of the gas in contact with the catalyst may be attained and maintained by utilizing for the preheating the heat in the reaction products without requiring the supply of heat from an external source once the reaction has been initiated and the catalyst, oxidation chamber and heat exchanger have been heated to the proper temperatures. It is sometimes desirable to provide means in oxidation chamber 5 for the extraction of heat from the gases in the chamber to preclude their obtaining an undesirably high temperature.

The gas from heat exchanger 4 containing nitrogen peroxide, chlorine and residual unoxidized nitrosyl chloride, is passed into the bottom of an absorber 6. The gas from the heat exchanger may be cooled before introducing it into the absorber. A cooling of the gas facilitates maintenance of the desired temperatures in the absorber. Absorber 6 comprises a tower containing bubbling plates or a packing material for ensuring an intimate contact between the gases rising through the tower and a liquid introduced into the top of the tower and passed downwardly therethrough in countercurrent flow with the gases. The gases introduced into the bottom of absorber 6 pass in contact with a flow of nitric acid introduced into the top of the absorber. This nitric acid is an aqueous acid containing about 60% to 90% $HNO_3$, preferably about 70% to 80% $HNO_3$, and having a temperature of about 20° to 40° C., preferably about 30° C. In absorber 6 the nitrogen peroxide is absorbed in the aqueous nitric acid and is converted to nitric acid by the aid of the chlorine present. The reaction taking place here may be expressed by the equation—

$$6NO_2 + 2H_2O + Cl_2 = 4HNO_3 + 2NOCl$$

The nitric acid flowing through absorber 6 absorbs the nitrosyl chloride formed by the conversion of nitrogen peroxide to nitric acid and also the nitrosyl chloride originally present in the gas entering the absorber. Chlorine gas substantially freed of nitrogen peroxide and nitrosyl chloride but containing some oxygen escapes from the top of the absorber and is passed into the bottom of a drying tower 7 where it is treated with sulfuric acid to dry the gas. The dried chlorine gas is compressed in compressor 8 and passed into a condenser 9 where it is cooled to a temperature at which the chlorine is liquefied. The liquid chlorine product is withdrawn from condenser 9. Liquid carbon dioxide may be employed as the cooling medium in the condenser. If desired, the gas leaving absorber 6 may be passed in contact with fresh nitric acid, for example an aqueous acid containing about 50% $HNO_3$, to remove residual nitrogen peroxide from the gas before it passes in contact with the sulfuric acid.

The nitric acid leaving absorber 6 and containing nitrosyl chloride and nitrogen peroxide is passed through a heater 10 and thence into the top of desorber 11, which is a tower containing bubbling plates or a packing material over which the nitric acid introduced into the top of the tower flows downwardly to the bottom. The nitric acid is passed into desorber 11 at a temperature above about 50° C., or preferably at about 60° C., in contact with oxygen gas introduced into the bottom of the desorber. In absorbing the nitrogen peroxide in the nitric acid in absorber 6 the nitrogen peroxide in larger part reacts with the water in the aqueous nitric acid to form nitric acid. The acid leaving absorber 6 also contains dissolved oxides of nitrogen. In treating this acid in desorber 11 some nitrogen peroxide is evolved from the solution and passes out of desorber 11 with the gases. The acid leaving absorber 6 not only contains dissolved nitrosyl chloride but some hydrochloric acid formed by reaction of chlorine and nitrosyl chloride with water in the nitric acid. These reactions forming hydrochloric acid may be expressed by the equation—

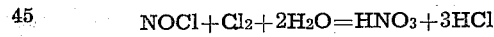

$$NOCl + Cl_2 + 2H_2O = HNO_3 + 3HCl$$

In desorber 11 at the elevated temperatures the hydrochloric acid which may thus be formed reacts with the nitric acid to form nitrosyl chloride and chlorine which are eliminated from the nitric acid solution along with absorbed nitrosyl chloride.

As a result of the reaction of nitrogen peroxide absorbed in the nitric acid with water in the aqueous acid, the acid leaving the bottom of the desorber 11 is somewhat more concentrated than the acid introduced into absorber 6. A portion of this nitric acid is withdrawn as product from the process and the remaining acid is passed through a cooler 12 and is mixed with sufficient water to dilute it to 70% $HNO_3$ before being returned to absorber 6 for the treatment of the nitrogen peroxide, chlorine and nitrosyl chloride gas. The amount of nitric acid thus withdrawn as product is equivalent to that formed by reaction of the nitrogen peroxide in the gas introduced into absorber 6.

The gases leaving desorber 11, containing oxygen, nitrosyl chloride and some nitrogen peroxide and chlorine, are introduced into the nitrosyl chloride and chlorine gas on its way to the oxidation treatment. The oxygen gas passed through desorber 11 and thence introduced into the nitrosyl chloride and chlorine gas is in amount sufficient for the oxidation of the nitrosyl chloride in the mixture of gases passed through heat exchanger 4 to oxidation chamber 5. By returning the gases from desorber 11 to oxidation chamber 5 the nitrosyl chloride in this gas may be oxidized to nitrogen peroxide and chlorine. The nitrogen peroxide and chlorine in the gas from desorber 11 are also returned by this mode of operation for treatment in absorber 6. Gases which remain uncondensed in the liquefaction of chlorine in condenser 9, which gases contain oxygen and chlorine may be introduced together with the fresh oxygen gas into desorber 11. By thus returning the uncondensed gases from condenser 9 and the gases from desorber 11 to the nitrosyl chloride and chlorine gas on its way to the oxidation step, susbtantially all of the nitrosyl chloride and chlorine in the gas from vessel 1 may eventually be recovered in the form of liquid chlorine and nitric acid. A portion of the gas from condenser 9, however, may be bled from the system to carry out with it inert gases introduced into the system with the oxygen gas or the nitrosyl chloride and chlorine and thus an accumulation of the inert gases in the system to an undesirable extent may be prevented.

In the procedure illustrated in Fig. 2 the separation of chlorine, nitrosyl chloride and nitrogen peroxide from the oxidized nitrosyl chloride and chlorine gas is accomplished by a procedure involving the liquefaction of these three materials and fractional distillation of the liquefied gases.

In Fig. 2 the numeral 21 designates a reaction vessel for carrying out the reaction between nitric acid and sodium chloride to form sodium nitrate and a gaseous product containing nitrosyl chloride and chlorine. This gaseous product is passed through a cooling coil 22 in which it is cooled to a temperature of, for example, −10° C. Water vapor is condensed from the gases and forms an aqueous solution of nitric acid with the nitric acid vapors and nitrogen oxides which may be present in the gases leaving vessel 21. Some hydrochloric acid may be formed by reaction of nitrosyl chloride and chlorine with the water but the small amount of condensate and its nitric acid content mitigate against removal from the cooled gas of a large proportion of its content of chlorine and nitrosyl chloride. The condensate is returned from cooling coil 22 to reaction vessel 21. This cooling coil is preferably of glass which is resistant to the action of the highly corrosive materials. The dry gas from cooling coil 22 is compressed in compressor 23 to a pressure of about 8 atmospheres. If desired, the gas may be heated before compression to prevent condensation of liquid during its compression. The compressed gas is mixed with sufficient oxygen to oxidize the nitrosyl chloride and is preheated in a heat exchanger 24 and passed through a reaction chamber 25. The hot products of the reaction are passed through heat exchanger 24 in heat exchange relation with the nitrosyl chloride and chlorine gas and serve to preheat this gas to the desired temperature. The preheating and oxidation of the nitrosyl chloride-chlorine gas may be carried out as described above in connection with the process of Fig. 1. While reaction chamber 25 may, if desired, contain a catalyst promoting the reaction of the nitrosyl chloride and oxygen, the presence of a catalyst is not necessary particularly when the gases are maintained under an elevated pressure such as about 8 atmospheres or more.

From heat exchanger 24 the gases, now containing chlorine, nitrogen peroxide and residual unoxidized nitrosyl chloride, are passed to a cooling coil 26 where the chlorine, nitrogen peroxide and nitrosyl chloride are condensed to form a liquid mixture of these three materials. The residual uncondensed gas containing oxygen may be returned to the nitrosyl chloride and chlorine gas introduced into heat exchanger 24 on its way to reaction chamber 25.

The liquid mixture from cooling coil 26 is introduced into the mid portion of rectifying column 27 in which it passes downwardly over bubbling plates or a packing contained in the column in contact with ascending vapors of nitrosyl chloride and nitrogen peroxide. These vapors heat the descending liquid and vaporize chlorine from it. The chlorine passes as a gas upwardly through column 27 while the nitrosyl chloride and nitrogen peroxide vapors are condensed and flow backwardly to the bottom of the column. By the time the liquid mixture introduced in column 27 reaches the bottom of the column it is substantially free of chlorine and is primarily a liquid mixture of nitrosyl chloride and nitrogen peroxide. This liquid is heated in the bottom of column 27 by a heater 28 to provide the vapors for the treatment of the liquid entering the column. The chlorine gas ascending through column 27 is contacted in the upper portion of the column with a reflux of liquid chlorine to remove from the gas any residual vapors of nitrosyl chloride and nitrogen peroxide, and the resulting purified chlorine gas passes to a condenser 29 where it is cooled to condense the chlorine. The liquid chlorine from condenser 29 is in part returned to the top of column 27 to provide the above described reflux for treatment of the chlorine gas in column 27, and the remainder is withdrawn as a liquid chlorine product of the process.

A liquid mixture of nitrogen peroxide and nitrosyl chloride is continuously withdrawn from the bottom of column 27 and introduced into the mid portion of a second rectifying column 30 containing bubbling plates or a packing material. The liquid is passed downwardly in this column in contact with ascending vapors of nitrogen peroxide. These vapors of nitrogen peroxide heat the liquid mixture and vaporize therefrom the nitrosyl chloride, the nitrogen peroxide being at the same time condensed. By the time the liquid reaches the bottom of column 30 it is substantially freed from nitrosyl chloride. The liquid nitrogen peroxide is heated in the bottom of column 30 by means of heater 31 to provide the nitrogen peroxide vapors for treatment of the liquid mixture descending in column 30. In the upper portion of column 30 the nitrosyl chloride vapors are contacted with a reflux of liquid nitrosyl chloride which serves to remove from the vapors any nitrogen peroxide and return the nitrogen peroxide to the bottom of column 30. The nitrosyl chloride vapors from the top of column 30 pass to a condenser 32 where they are cooled to condense a portion of the nitrosyl chloride which is returned to the top of column 30 to serve as the reflux described above. The remaining uncondensed nitrosyl chloride is returned to and mixed with the nitrosyl chloride and chlorine gas from cooling coil 22 for oxidation of the returned nitrosyl chloride to form nitrogen peroxide and chlorine. From the bottom of column 30 liquid nitrogen peroxide is withdrawn and reacted with water and air in a reaction vessel 33 to form nitric acid which may be employed in reaction vessel 21 for the production of sodium nitrate.

By returning the uncondensed gases from cooling coil 26 and the nitrosyl chloride from condenser 32 to heat exchanger 24 and reaction chamber 25, substantially all of the nitrosyl chloride and chlorine content of the gases from cooling coil 22 eventually may be recovered as liquid chlorine product from condenser 29 and as nitric acid from reaction vessel 33. In order to obtain a pure liquid chlorine product, rectification column 27 may be operated with such a ratio of reflux liquid chlorine returned to the top of the column that some chlorine will remain in the nitrogen peroxide-nitrosyl chloride mixture withdrawn from the bottom of column 27. Rectification column 30 may be operated with a relatively large ratio of vapors of nitrogen peroxide passed in contact with the descending liquid in this column so that the liquid withdrawn from the bottom of the column contains substantially no chlorine or nitrosyl chloride but the vapors passing out of condenser 32 contain in addition to the nitrosyl chloride, any chlorine in the nitrogen peroxide-nitrosyl chloride mixture introduced into column 30, together with some nitrogen peroxide. As noted above, by returning these vapors from condenser 32 for oxidation of the nitrosyl chloride and treatment in cooling coil 26 and rectification columns 27 and 30, the chlorine and nitrogen peroxide in the vapors escaping from condenser 32 may ultimately be recovered. In order to prevent the accumulation of inert gases in the gas treating system to an undesirable extent, a portion of the uncondensed gases from cooling coil 26 may be vented from the system.

While the entire treatment of the gases for oxidation of nitrosyl chloride, condensation of the mixture of nitrogen peroxide, chlorine and nitrosyl chloride and separation of the three products by fractional distillation may all be carried out under substantially the same elevated pressure of about 8 atmospheres, it is preferred to employ a somewhat lower pressure for the rectification of the nitrogen peroxide-nitrosyl chloride mixture than for the rectification of the nitrogen peroxide-nitrosyl chloride-chlorine mixture. Thus it is preferred to operate rectification column 30 at a pressure of about 1 or more atmospheres lower than those preferred in rectification column 27. It is preferred to operate column 30 under a pressure of about 4 to 8 atmospheres, even though the pressure in rectification column 27 may be above the pressure of 8 atmospheres referred to above.

Since certain changes may be made in carrying out the above described process without departing from the scope of the invention, it is intended that the above description shall be interpreted as illustrative and not in a limiting sense. For example, the drying of the nitrosyl chloride and chlorine gas in cooling coil 22 of Fig. 2 may be accomplished by passing the gas in contact with a drying agent such as $CaCl_2.2H_2O$, aqueous phosphoric acid solution containing for example 85% $H_3PO_4$, or other suitable drying agent which does not react with either the nitrosyl chloride or the chlorine in the gas. Again, while in the process of Fig. 1 the gas from desorber 11 is returned directly for oxidation of its nitrosyl chloride content, this gas may be passed from the desorber in contact with moist solid sodium, potassium or calcium chloride to form the corresponding nitrate by reaction of the nitrogen peroxide contained in the gas with the chloride. The gas after contact with the moist chloride may then be passed to heat exchanger 4 and oxidation chamber 5 for oxidation of its nitrosyl chloride. If desired, an excess of solid chloride may be used for treating the gas from the desorber and the resulting mixture of chloride and nitrate introduced into reaction vessel 1. Further, the gas from desorber 11 may be passed directly into reaction vessel 1 and in that vessel contacted with the mixture of chloride and nitric acid being treated for the production of nitrate. In thus operating, the nitrogen peroxide in the gas acts upon the chloride in vessel 1 to form nitrate and the unabsorbed gases facilitate the reaction of the chloride and nitric acid by serving to strip the gaseous products of the reaction from the reaction mixture.

In my copending application Serial No. 697,240, filed November 9, 1933, I am claiming the process disclosed herein for producing nitric acid by reacting nitrogen peroxide and chlorine with aqueous nitric acid.

In my copending application Serial No. 247,087, filed December 21, 1938, I am claiming the process disclosed herein for the production of a metal chloride and chlorine by reacting nitric acid and a metal chloride to form nitrosyl chloride and chlorine, oxidizing the nitrosyl chloride to nitrogen peroxide and chlorine, separating the nitrogen peroxide from the chlorine and reacting the separated nitrogen peroxide with a metal chloride to form a metal nitrate and nitrosyl chloride which may be returned for oxidation to form additional nitrogen peroxide for reaction with metal chloride.

I claim:

1. The process for the treatment of a mixture of nitrosyl chloride and chlorine which comprises heating said mixture with oxygen to partially oxidize nitrosyl chloride to nitrogen peroxide and chlorine and form a mixture of nitrogen peroxide, chlorine and residual unoxidized nitrosyl chloride, containing more than 1 mol of chlorine to 6 mols of nitrogen peroxide, passing said mixture in contact with concentrated nitric acid at a temperature at which the nitrogen peroxide and nitrosyl chloride are absorbed in said concentrated nitric acid and in amount sufficient to absorb substantially completely the nitrogen peroxide and nitrosyl chloride and leave unabsorbed chlorine gas, separating the resulting solution of nitrosyl chloride in concentrated nitric acid from the chlorine unabsorbed in the acid and heating the thus separated acid solution to a temperature at which nitrosyl chloride is evolved therefrom and thus recovering the evolved nitrosyl chloride separate from said chlorine gas.

2. The process for the treatment of a mixture of nitrosyl chloride and chlorine which comprises heating said mixture with oxygen to partially oxidize nitrosyl chloride to nitrogen peroxide and chlorine and form a mixture of nitrogen peroxide, chlorine and residual unoxidized nitrosyl chloride, containing more than 1 mol of chlorine to 6 mols of nitrogen peroxide, passing said mixture in contact with concentrated nitric acid at a temperature below about 50° C. in amount sufficient to absorb substantially completely the nitrogen peroxide and nitrosyl chloride and leave unabsorbed chlorine gas, separating the resulting solution of nitrosyl chloride in concentrated nitric acid from the chlorine gas, and then heating the resulting acid solution to a temperature above about 50° C. to recover therefrom gaseous nitrosyl chloride separate from the aforesaid chlorine gas.

3. The process for the treatment of a mixture of nitrosyl chloride and chlorine which comprises heating said mixture with oxygen to partially oxidize nitrosyl chloride to nitrogen peroxide and chlorine, passing the mixture of nitrogen peroxide, chlorine and residual unoxidized nitrosyl chloride in contact with concentrated nitric acid at a temperature below about 50° C. to absorb nitrogen peroxide and nitrosyl chloride, heating the resulting acid solution to a temperature above about 50° C. to recover therefrom nitrosyl chloride, cooling the acid from which nitrosyl chloride has been evolved to below about 50° C. and returning the cooled acid for absorption of nitrogen peroxide and nitrosyl chloride from said mixture of nitrogen peroxide, chlorine and nitrosyl chloride, introducing water into the acid returned for absorption of nitrogen peroxide and nitrosyl chloride and introducing the nitrosyl chloride recovered from said acid solution into the aforesaid mixture of nitrosyl chloride and chlorine which is heated with oxygen to oxidize the nitrosyl chloride.

4. The process for the treatment of a mixture of nitrosyl chloride and chlorine which comprises heating said mixture with oxygen to oxidize partially nitrosyl chloride to nitrogen peroxide and chlorine passing the mixture of nitrogen peroxide, chlorine and residual unoxidized nitrosyl chloride in contact with concentrated nitric acid at a temperature below about 50° C. to absorb nitrogen peroxide and nitrosyl chloride, heating the resulting acid solution to a temperature above about 50° C. to evolve therefrom a gas containing nitrosyl chloride and nitrogen peroxide, cooling the acid from which nitrosyl chloride has been evolved to below about 50° C. and returning the cooled acid for absorption of nitrogen peroxide and nitrosyl chloride from said mixture of nitrogen peroxide, chlorine and nitrosyl chloride, introducing water into the acid returned for absorption of nitrogen peroxide and nitrosyl chloride, passing the nitrosyl chloride-nitrogen peroxide gas evolved from said acid solution in contact with moist solid chloride to absorb nitrogen peroxide and form a nitrate, and then introducing the thus treated gas containing nitrosyl chloride into the aforesaid mixture of nitrosyl chloride and chlorine which is heated with oxygen to oxidize the nitrosyl chloride.

5. In a process for the treatment of a gas containing nitrogen peroxide, chlorine and nitrosyl chloride, in which there is present more than 1 mol chlorine to 6 mols of nitrogen peroxide, the improvement which comprises passing said gas in contact with concentrated nitric acid at a temperature below about 50° C. in amount sufficient to absorb substantially completely the nitrogen peroxide and nitrosyl chloride and leave unabsorbed chlorine gas, thereby reacting the nitrogen peroxide and a portion of said chlorine with water present in said concentrated nitric acid to form nitric acid and nitrosyl chloride which is absorbed in the concentrated nitric acid, separating the resulting solution of nitrosyl chloride in concentrated nitric acid from the chlorine gas, and then heating the resulting acid solution to a temperature above about 50° C. to recover therefrom gaseous nitrosyl chloride.

6. In a process for the treatment of a gas containing nitrogen peroxide, chlorine and nitrosyl chloride the improvement which comprises passing said gas in contact with concentrated nitric acid at a temperature below about 50° C. to absorb the nitrogen peroxide and nitrosyl chloride, heating the resulting acid solution to a temperature above about 50° C. to evolve therefrom a gaseous mixture containing nitrosyl chloride and nitrogen peroxide, and passing said gaseous mixture in contact with a moist solid chloride to absorb the nitrogen peroxide and form a nitrate.

7. In a process for the treatment of a gas containing nitrogen peroxide, chlorine and nitrosyl chloride, in which there is present more than 1 mol chlorine to 6 mols of nitrogen peroxide, the improvement which comprises passing said gas in contact with concentrated nitric acid at a temperature below about 50° C. in amount sufficient to absorb substantially completely the nitrogen peroxide and nitrosyl chloride and leave unabsorbed chlorine gas, thereby reacting the nitrogen peroxide and a portion of said chlorine with water present in said concentrated nitric acid to form nitric acid and nitrosyl chloride which is absorbed in the concentrated nitric acid, separating the resulting solution of nitrosyl chloride in concentrated nitric acid from the chlorine gas, heating the resulting acid solution to a temperature above about 50° C. to recover therefrom gaseous nitrosyl chloride, cooling the acid from which nitrosyl chloride has been evolved to below about 50° C. and returning the cooled acid for absorption of nitrogen peroxide and nitrosyl chloride from said mixture of nitrogen peroxide, chlorine and nitrosyl chloride and introducing water into the acid returned for the absorption of nitrogen peroxide and nitrosyl chloride.

8. In a process for the treatment of a gas containing nitrogen peroxide, chlorine and nitrosyl chloride, in which there is present more than 1 mol chlorine to 6 mols of nitrogen peroxide, the improvement which comprises passing said gas in contact with concentrated nitric acid at a temperature of about 30° C. in amount sufficient to absorb substantially completely the nitrogen peroxide and nitrosyl chloride and leave unabsorbed chlorine gas, separating the resulting solution of nitrosyl chloride in concentrated nitric acid from the chlorine gas, heating the resulting acid solution to a temperature of about 60° C. to recover therefrom gaseous nitrosyl chloride separate from the aforesaid chlorine gas, cooling the acid from which nitrosyl chloride has been evolved to about 30° C. and returning the cooled acid for absorption of nitrogen peroxide and nitrosyl chloride from said mixture of nitrogen peroxide, chlorine and nitrosyl chloride and introducing water into the acid returned for the absorption of nitrogen peroxide and nitrosyl chloride.

9. In a process for the oxidation of nitrosyl chloride to nitrogen peroxide and chlorine the improvement which comprises passing said nitrosyl chloride with oxygen at an elevated temperature in contact with an aluminum compound catalyzing the oxidation reaction of nitrosyl chloride.

10. In a process for the oxidation of nitrosyl chloride to nitrogen peroxide and chlorine the improvement which comprises passing said nitrosyl chloride with oxygen at an elevated temperature in contact with alumina.

11. In a process for the oxidation of nitrosyl chloride to nitrogen peroxide and chlorine the improvement which comprises passing said nitrosyl chloride with oxygen at an elevated temperature in contact with activated alumina.

12. In a process for the oxidation of nitrosyl chloride to nitrogen peroxide and chlorine the improvement which comprises passing said nitrosyl chloride with oxygen at an elevated temperature in contact with bauxite.

13. In a process for the oxidation of nitrosyl chloride to nitrogen peroxide and chlorine the improvement which comprises passing said nitrosyl chloride with oxygen at an elevated temperature in contact with alumina prepared by heating an aluminum hydroxide crystallized from a solution of a soluble aluminate.

14. In a process for the oxidation of nitrosyl chloride to nitrogen peroxide and chlorine the improvement which comprises passing said nitrosyl chloride with oxygen at an elevated temperature in contact with alumina prepared by neutralizing with carbon dioxide the excess alkalinity of an alkaline solution of sodium aluminate, cooling the thus treated solution to crystallize aluminum hydroxide therefrom, and heating the aluminum hydroxide to dehydrate it.

15. The process for the treatment of a mixture of nitrosyl chloride and chlorine which comprises heating said mixture with oxygen to oxidize nitrosyl chloride to nitrogen peroxide and chlorine, passing the resulting mixture of gases containing nitrogen peroxide and chlorine in contact with concentrated nitric acid, and contacting said nitric acid with the mixture of gases in amount and at a temperature such that the nitrogen peroxide is substantially completely removed from the mixture of gases and the acid used for treating the mixture of gases retains in solution the nitrosyl chloride formed in the absorption and reaction of the nitrogen peroxide with the nitric acid and chlorine present in the mixture of gases and any nitrosyl chloride originally present in the mixture of gases which is passed into contact with said concentrated aqueous nitric acid.

16. The process for the treatment of a mixture of nitrosyl chloride and chlorine which comprises heating said mixture with oxygen to oxidize partially nitrosyl chloride to nitrogen peroxide and chlorine, passing the mixture of nitrogen peroxide, chlorine and residual unoxidized nitrosyl chloride in contact with concentrated nitric acid to absorb nitrogen peroxide and nitrosyl chloride, heating the resulting acid solution and passing an oxygen gas in contact with the heated solution to recover therefrom nitrosyl chloride, and introducing the resulting mixture of oxygen and nitrosyl chloride recovered from said acid solution into the aforesaid mixture of nitrosyl chloride and chlorine which is heated with oxygen to oxidize the nitrosyl chloride.

17. The process for the treatment of a mixture of nitrosyl chloride and chlorine which comprises heating said mixture with oxygen to oxidize partially nitrosyl chloride to nitrogen peroxide and chlorine, passing the mixture of nitrogen peroxide, chlorine and residual unoxidized nitrosyl chloride in contact with concentrated nitric acid at a temperature at which the nitrogen peroxide and nitrosyl chloride are absorbed, removing the resulting solution of nitrosyl chloride in nitric acid from contact with said mixture of nitrogen peroxide, chlorine and nitrosyl chloride, heating the thus separated acid solution to a temperature at which nitrosyl chloride is evolved therefrom and introducing the thus recovered nitrosyl chloride into the first mentioned mixture of nitrosyl chloride and chlorine which is heated with oxygen to oxidize the nitrosyl chloride.

18. The process for the treatment of a mixture of nitrosyl chloride and chlorine which comprises heating said mixture with oxygen to oxidize partially nitrosyl chloride to nitrogen peroxide and chlorine, passing the mixture of nitrogen peroxide, chlorine and residual unoxidized nitrosyl chloride in contact with concentrated nitric acid at a temperature at which the nitrogen peroxide and nitrosyl chloride are absorbed, then heating the resulting acid solution to a temperature at which nitrosyl chloride is evolved therefrom, cooling the acid from which nitrosyl chloride has been evolved and returning the cooled acid for absorption of nitrogen peroxide and nitrosyl chloride from said mixture of nitrogen peroxide, chlorine and nitrosyl chloride, introducing water into the acid returned for absorption of nitrogen peroxide and nitrosyl chloride, and introducing the nitrosyl chloride recovered from said acid solution into the aforesaid mixture of nitrosyl chloride and chlorine which is heated with oxygen to oxidize the nitrosyl chloride.

19. The process for the treatment of a mixture of nitrosyl chloride and chlorine which comprises heating said mixture with oxygen to oxidize partially nitrosyl chloride to nitrogen peroxide and chlorine and form a mixture of nitrogen peroxide, chlorine and residual unoxidized nitrosyl chloride containing more than 1 mol of chlorine to 6 mols of nitrogen peroxide, passing said mixture in contact with concentrated aqueous nitric acid at a temperature at which the nitrogen peroxide reacts with the water in said acid and chlorine to form nitric acid and nitrosyl chloride and the nitrosyl chloride is absorbed leaving unabsorbed chlorine gas, removing the resulting solution of nitrosyl chloride in nitric acid from contact with said chlorine gas, heating the thus separated acid solution to a temperature at which nitrosyl chloride is evolved to recover nitrosyl chloride separate from said chlorine gas, cooling the thus heated acid, returning the cooled acid for absorption of nitrogen peroxide and nitrosyl chloride from said mixture of nitrogen peroxide, chlorine and nitrosyl chloride, and introducing water into the acid returned for the absorption of nitrogen peroxide and nitrosyl chloride.

20. The process for the treatment of a mixture of nitrosyl chloride and chlorine which comprises heating said mixture with oxygen to oxidize partially nitrosyl chloride to nitrogen peroxide and chlorine and form a mixture of nitrogen peroxide, chlorine and residual unoxidized nitrosyl chloride containing more than 1 mol of chlorine to 6 mols of nitrogen peroxide, passing said mixture in contact with concentrated aqueous nitric acid at a temperature below about 50° C. in amount sufficient to react the nitrogen peroxide with the water in said acid and chlorine and to absorb substantially completely nitrosyl chloride and leave unabsorbed chlorine gas, separating the resulting solution of nitrosyl chloride in concentrated nitric acid from the chlorine gas, heating the resulting acid solution to a temperature above about 50° C. to recover therefrom gaseous nitrosyl chloride separate from the aforesaid chlorine gas, cooling the acid from which nitrosyl chloride has been evolved to below about 50° C., returning the cooled acid for absorption of nitrogen peroxide and nitrosyl chloride from said mixture of nitrogen peroxide, chlorine and nitrosyl chloride, and introducing water into the acid returned for absorption of nitrogen peroxide and nitrosyl chloride.

21. The process for the treatment of a mixture of nitrosyl chloride and chlorine which comprises heating said mixture with oxygen to oxidize nitrosyl chloride to nitrogen peroxide and chlorine, and form a mixture of gases containing nitrogen peroxide and chlorine containing more than 1 mol of chlorine to 6 mols of nitrogen peroxide, passing said mixture in contact with concentrated aqueous nitric acid containing about 60% to about 90% $HNO_3$ and contacting said nitric acid with the mixture of gases in amount and at a temperature such that the nitrogen peroxide is substantially completely removed from the mixture of gases and the acid used for treating the mixture of gases retains in solution the nitrosyl chloride formed in the absorption and reaction of the nitrogen peroxide with the nitric acid and a portion only of the chlorine present in the mixture of gases and any nitrosyl chloride originally present in the mixture of gases which is passed into contact with said concentrated aqueous nitric acid, and separating the resulting solution of nitrosyl chloride in concentrated nitric acid from the unabsorbed chlorine gas.

22. The process for the treatment of a mixture of nitrosyl chloride and chlorine which comprises heating said mixture with oxygen to oxidize nitrosyl chloride to nitrogen peroxide and chlorine, passing the resulting mixture of gases containing nitrogen peroxide and chlorine containing more than 1 mol of chlorine to 6 mols of nitrogen peroxide in contact with concentrated aqueous nitric acid containing about 60% to about 90% $HNO_3$ and contacting said nitric acid with the mixture of gases at a temperature of about 20° C. to about 40° C. in amount such that the nitrogen peroxide is substantially completely removed from the mixture of gases and the acid used for treating the mixture of gases retains in solution the nitrosyl chloride formed in the absorption and reaction of the nitrogen peroxide with the nitric acid and a portion only of the chlorine present in the mixture of gases and any nitrosyl chloride originally present in the mixture of gases which is passed into contact with said concentrated aqueous nitric acid, and separating the resulting solution of nitrosyl chloride in concentrated nitric acid from the unabsorbed chloride gas.

HERMAN A. BEEKHUIS, Jr.